United States Patent
Baralon

(10) Patent No.: US 10,215,042 B2
(45) Date of Patent: Feb. 26, 2019

(54) GAS TURBINE ENGINE

(71) Applicant: ROLLS-ROYCE PLC, London (GB)

(72) Inventor: Stephane Michel Marcel Baralon, Derby (GB)

(73) Assignee: ROLLS-ROYCE plc, London (GB)

( * ) Notice: Subject to any disclaimer, the term of this patent is extended or adjusted under 35 U.S.C. 154(b) by 531 days.

(21) Appl. No.: 14/881,965

(22) Filed: Oct. 13, 2015

(65) Prior Publication Data

US 2016/0130961 A1  May 12, 2016

(30) Foreign Application Priority Data

Nov. 11, 2014  (GB) .................................. 1420011.7

(51) Int. Cl.
*F01D 9/06*  (2006.01)
*F01D 9/02*  (2006.01)
(Continued)

(52) U.S. Cl.
CPC ............... *F01D 9/065* (2013.01); *F01D 5/02* (2013.01); *F01D 9/02* (2013.01); *F01D 9/041* (2013.01);
(Continued)

(58) Field of Classification Search
CPC .......... F01D 5/143; F01D 9/065; F01D 9/041; F01D 9/02; F01D 5/02; F01D 17/105;
(Continued)

(56) References Cited

U.S. PATENT DOCUMENTS 5,315,821 A  5/1994 Dunbar et al.
5,369,954 A  12/1994 Stuart
(Continued)

FOREIGN PATENT DOCUMENTS

DE  102009042242 A1  4/2011
EP  0394102 A1  10/1990
(Continued)

OTHER PUBLICATIONS

Mar. 15, 2016 Search Report issued in European Patent Application No. 15189462.
Oct. 6, 2017 Office Action issued in U.S. Appl. No. 14/881,962.
Mar. 15, 2016 Search Report issued in European Patent Application No. 15189460.
May 14, 2015 Search Report issued in British Patent Application No. 1420010.9.
(Continued)

*Primary Examiner* — Carlos A Rivera
*Assistant Examiner* — Danielle M. Christensen
(74) *Attorney, Agent, or Firm* — Oliff PLC

(57) ABSTRACT

A gas turbine engine includes in axial flow series a fan rotor, a series of outlet guide vanes for guiding flow from the fan rotor; and a bifurcation. The gas turbine engine further includes a substantially annular fluid passageway extending from fan to the bifurcation, the outlet guide vanes being positioned within the passageway. The passageway includes a profiled region positioned upstream of the bifurcation, the profiled region including a first circumferential portion positioned adjacent a second circumferential portion, the first circumferential portion having a first average radial thickness and a second circumferential portion having a second average radial thickness, the first average radial thickness being smaller than second average radial thickness. The profiled region of the passageway is configured to modify the flow through the passageway so as to improve uniformity of a static pressure field from immediately upstream of the bifurcation to just downstream of the fan rotor.

17 Claims, 13 Drawing Sheets

(51) Int. Cl.
*F01D 25/06* (2006.01)
*F02K 3/04* (2006.01)
*F01D 5/02* (2006.01)
*F01D 9/04* (2006.01)
*F01D 17/10* (2006.01)
*F01D 25/24* (2006.01)

(52) U.S. Cl.
CPC ........... *F01D 17/105* (2013.01); *F01D 25/06* (2013.01); *F01D 25/24* (2013.01); *F02K 3/04* (2013.01); *F05D 2220/32* (2013.01); *F05D 2220/36* (2013.01); *F05D 2240/12* (2013.01); *F05D 2240/20* (2013.01); *F05D 2250/14* (2013.01); *F05D 2250/71* (2013.01); *F05D 2260/96* (2013.01)

(58) Field of Classification Search
CPC ...... F01D 25/24; F01D 25/06; F05D 2250/71; F05D 2260/96; F05D 2220/32; F05D 2220/36; F05D 2240/20; F05D 2240/12; F05D 2250/14; F02K 3/04
See application file for complete search history.

(56) References Cited

U.S. PATENT DOCUMENTS

| | | |
|---|---|---|
| 8,444,378 B2 | 5/2013 | Clemen |
| 2004/0081548 A1 | 4/2004 | Zess et al. |
| 2012/0315136 A1 | 12/2012 | Sonoda et al. |

FOREIGN PATENT DOCUMENTS

| | | |
|---|---|---|
| EP | 2098714 A2 | 9/2009 |
| EP | 2371714 A2 | 10/2011 |
| EP | 2657482 A1 | 10/2013 |
| GB | 888080 A | 1/1962 |
| WO | 2014/028056 A1 | 2/2014 |
| WO | 2014/099102 A1 | 6/2014 |
| WO | 2014/143290 A1 | 9/2014 |
| WO | 2014/197062 A2 | 12/2014 |
| WO | 2015/041758 A1 | 3/2015 |

OTHER PUBLICATIONS

May 13, 2015 Search Report issued in British Patent Application No. 1420011.7.
U.S. Appl. No. 14/881,962, filed Oct. 13, 2015 in the name of Baralon.

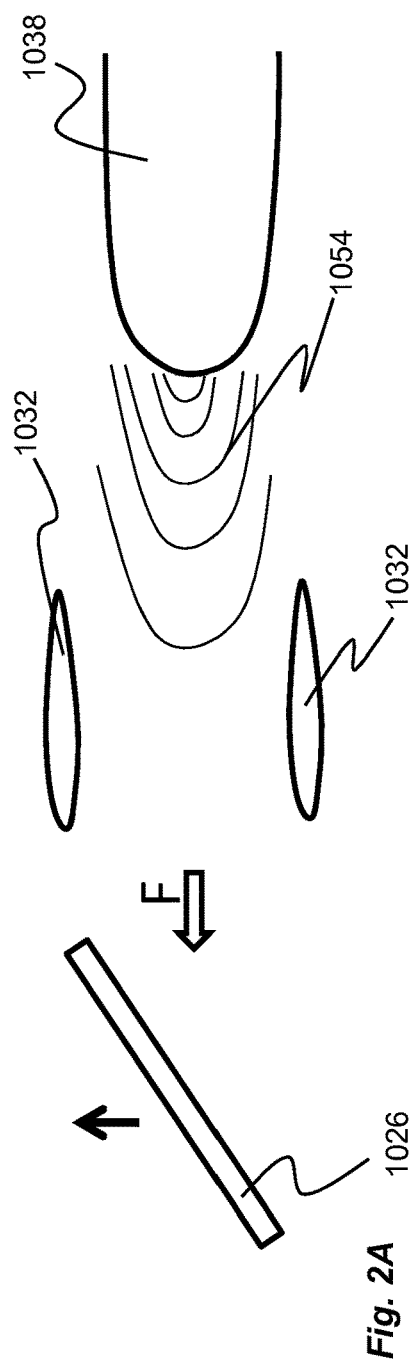
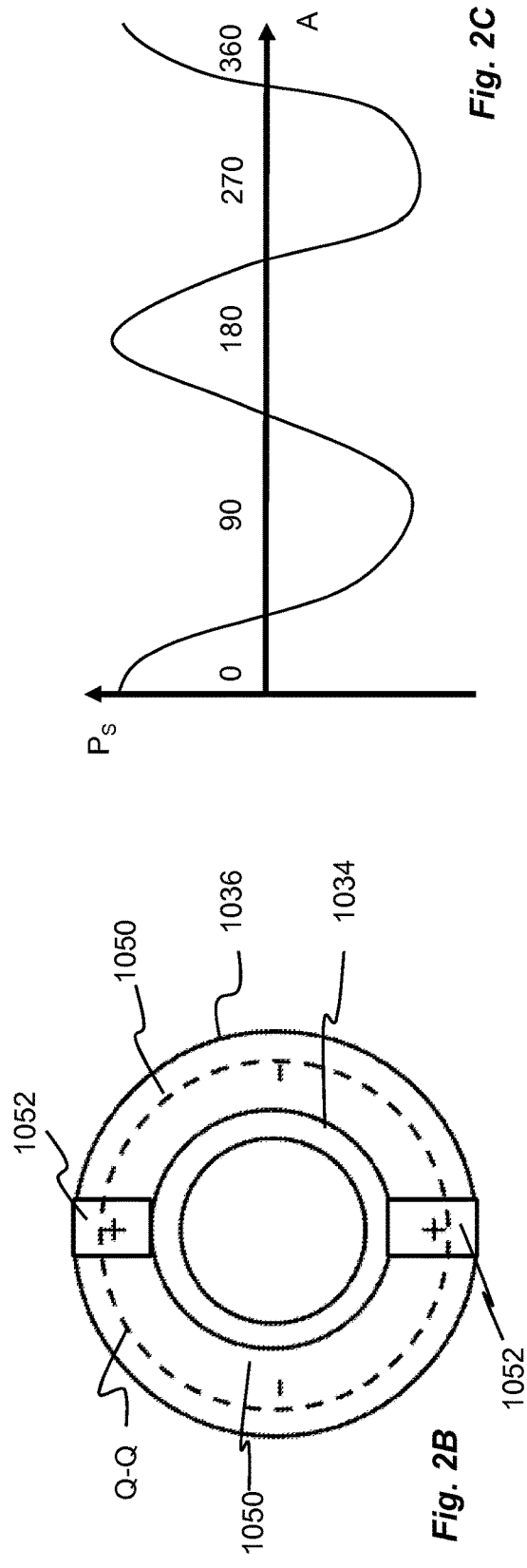

GAS TURBINE ENGINE

FIELD OF INVENTION

The present invention relates to a gas turbine engine, in particular a gas turbine engine having in axial flow series a fan, a series of outlet guide vanes and a bifurcation.

BACKGROUND

Turbofan gas turbine engines (which may be referred to simply as 'turbofans') are typically employed to power aircraft. Turbofans are particularly useful on commercial aircraft where fuel consumption is a primary concern. Referring to FIG. 1, typically a turbofan gas turbine engine 1010 will comprise an axial fan 1012 driven by an engine core 1015. The engine core is generally made up of one or more turbines which drive respective compressors via coaxial shafts. The fan is usually driven directly off an additional lower pressure turbine in the engine core.

The turbofan gas turbine engine 1010 is generally provided with outlet guide vanes (OGVs) 1032 downstream of the fan 1012 for straightening flow from the fan. Typically one or two bifurcations 1038 are provided downstream of the OGVs between the inner and outer walls of the bypass duct. The bifurcations include aerodynamically shaped fairings around the pylon structure for the purpose of encasing and directing electrical connections. Usually one bifurcation is positioned between the engine core 1015 and a pylon 1008 that mounts the engine to the wing of an aircraft. If two bifurcations are provided, the second bifurcation is generally positioned diametrically opposite the bifurcation shown in FIG. 1.

However, the bifurcation provides a substantial and undesirable blockage to the flow downstream of the OGVs. This means that part of the flow from the OGVs stagnates at the bifurcation leading edge. The stagnated flow reaches a high static pressure equal to the incoming total pressure, also called stagnation pressure. The remaining flow from the OGVs flows around the bifurcation which results in an acceleration, hence a reduction in pressure. The resulting high leading edge stagnation pressure and the low pressure around the area of high pressure bring a significant peak-to-peak variation in the static pressure field seen from the OGV trailing-edge.

This problem is illustrated in FIGS. 2A, 2B and 2C. Referring to FIG. 2A, the static pressure field is indicated at 1054 and the resulting force on the fan is indicated by arrow F. Referring to FIG. 2B, the region between the bifurcation 1038 and the OGVs 1032 (both shown in FIG. 2A) is illustrated. As can be seen in FIG. 2B, an area of high static pressure 1052 is formed in a region corresponding to the position of the two bifurcations, and an area of low pressure 1050 is formed in a region corresponding to a position between (i.e. away from) the two bifurcations. Referring to FIG. 2C, the circumferential static pressure $P_S$ variation is plotted against the circumferential position represented as an angle (in degrees) from a 0° position that is substantially aligned with the upper bifurcation centre line. As can be seen the static pressure varies circumferentially between the a maximum at a position substantially aligned with the centreline of the bifurcation and a minimum at a position corresponding to 90° from the centreline of the bifurcation.

One method of addressing this problem is to alter the stagger angle and/or camber of the OGVs to reduce the peak-to-peak variation in the static pressure field as seen by the rotor upstream of the OGV row. However, with this method there is still a level of residual pressure variation upstream of the OGV row. This pressure variation exerts a significant forcing on the fan blades. Furthermore, altering the stagger angle and/or camber of the OGVs can reduce aerodynamic efficiency by introducing increased pressure losses.

Accordingly, there is a need for a solution that reaches a balance between minimising the forcing on the fan blades and maximising the aerodynamic efficiency of the OGVs.

SUMMARY OF INVENTION

The present invention seeks to address one or more problems associated with gas turbine engines of the prior art.

A first aspect of the disclosure provides a gas turbine engine comprising in axial flow series: a fan having a fan rotor; a series of outlet guide vanes for guiding flow from the fan, the outlet guide vanes having a leading edge and a trailing edge; and a bifurcation. The gas turbine engine further comprises a substantially annular fluid passageway extending from the fan rotor to the bifurcation, the outlet guide vanes being positioned within the passageway. The passageway includes a profiled region provided upstream of the bifurcation (e.g. upstream of a leading edge of the bifurcation). The profiled region includes a first circumferential portion positioned adjacent a second circumferential portion. The first circumferential portion has a first average radial thickness and the second circumferential portion has a second average radial thickness. The first average radial thickness is smaller than the second average radial thickness. The profiled region of the passageway is configured to modify the flow through the passageway so as to improve the uniformity of a static pressure field from immediately upstream of the bifurcation to a position downstream of the fan rotor.

Provision of a first portion having a smaller radial thickness than the second portion can result in a more uniform static pressure distribution immediately upstream of the bifurcation to just downstream of the fan rotor, e.g. at the entrance of the fan flow passageway. A more uniform static pressure distribution means less forcing on the fan blades, and therefore reduced fan blade vibration.

The radial thickness of the annular fluid passageway refers to the radial distance between an inner circumference and an outer circumference of the passageway.

In the present application an axial direction refers to a direction parallel to a principal longitudinal axis of the gas turbine engine and a radial direction refers to a direction perpendicular to the longitudinal axis.

The profiled region may be provided upstream of the trailing edge of the OGVs.

The profiled region may be provided downstream of the fan rotor (e.g. downstream of fan blades of the fan rotor).

The profile of the first circumferential portion may be shaped to have a single maxima or a single minima. The profile of the second circumferential portion may be shaped to have a single maxima or a single minima.

The first circumferential portion may be positioned in a region corresponding to a circumferential position of the bifurcation. The circumferential extent of the first circumferential portion may be substantially equal to the circumferential extent of the bifurcation.

The second circumferential portion may be positioned in a region corresponding to a circumferential position away from the bifurcation. For example, the second circumferential portion may be positioned in a region corresponding to a position adjacent to the bifurcation. The gas turbine engine may comprise two bifurcations and the second portion may extend between the two bifurcations.

The fluid passageway may comprise a curved or angled portion axially adjacent the profiled portion so as to provide a graduated transition between the profiled region and the remainder of the passageway.

The profiled region may be upstream of the outlet guide vanes.

The profiled region may be provided between the fan and the outlet guide vanes.

The profiled region may be spaced rearward of the fan rotor (e.g. rearward from blades of the fan).

The profiled region may be at an axial position corresponding to the axial position of the outlet guide vanes between the leading edge and trailing edge of said outlet guide vanes.

A plurality of passages may be defined between adjacent outlet guide vanes and the first circumferential portion may extend continuously over two or more of the passages. For example, the first circumferential portion may extend continuously over three or more outlet guide vanes.

The profiled portion of the passageway may have an outer circumference and an inner circumference, and the inner circumference and/or the outer circumference may include a first portion having a first average curvature and a second portion having a second average curvature. The first average curvature may be different to the second average curvature.

The inner circumference and/or the outer circumference may include a region that is convex when compared to the nominal circumference of the casing. For example, the inner circumference of the first portion may include a region that is convex and/or the outer circumference of the second portion may include a region that is convex.

The inner circumference and/or outer circumference may include a region that is concave when compared to the nominal circumference of the casing. For example, the outer circumference of the first portion may include a region that is concave and/or the inner circumference of the second portion may include a region that is concave.

The radius of curvature of the first portion may vary at different circumferential positions of the first portion.

The radius of curvature of the first portion may be constant along the circumferential extent of the first portion.

The radius of curvature of the second portion may vary at different circumferential positions of the second portion.

The radius of curvature of the second portion may be constant along the circumferential extent of the second portion.

The gas turbine engine may comprise two bifurcations. The two bifurcations may be provided at diametrically opposed positions. When two bifurcations are provided, the gas turbine engine may comprise a third circumferential portion and a fourth circumferential portion, the third circumferential portion having a third average radial thickness and the fourth circumferential portion having a fourth average radial thickness, the third average radial thickness may be smaller than the fourth average radial thickness. The third circumferential portion may have one or more of the optional features of the first circumferential portion. The fourth circumferential portion may have one or more of the optional features of the second circumferential portion. The first circumferential portion may be provided in a position corresponding to the position of one of the bifurcations and the third circumferential portion may be provided in a position corresponding to the position of the other bifurcation. The second and fourth circumferential portions may be provided in a position corresponding to a position between the two bifurcations.

The gas turbine engine may comprise an outer casing defining a radially outer extent of the annular fluid passageway. The outer casing may be shaped to at least partially define the profiled region.

The gas turbine engine may comprise an inner casing defining a portion of the radially inner extent of the fluid passageway. The inner casing may be shaped to at least partially define the profiled region. For example, in the region of the first circumferential portion, the inner casing may comprise a first circumferential portion having first radius and a second circumferential portion having a second radius, the first radius being greater than the second radius. Additionally or alternatively, the outer casing may comprise a first circumferential portion having a first radius and a second circumferential portion having a second radius, the first radius being smaller than the second radius.

The inner casing and/or the outer casing may comprise a curved or angled portion axially adjacent the profiled portion so as to provide a graduated transition between the profiled region and the remainder of the inner casing and/or outer casing respectively.

The profiled portion of the inner and/or outer casing may have a first portion having a first average curvature and a second portion having a second average curvature, the first average curvature being different to the second average curvature.

The inner casing and/or the outer casing may include a region that is convex when compared to the nominal circumference of the casing. For example, the inner casing may at least partly define the first circumferential portion and include a region that is convex. The outer casing may at least partly define the second circumferential portion and include a region that is convex.

The inner casing and/or outer casing may include a region that is concave when compared to the nominal circumference of the casing. For example, the outer casing may at least partly define the first circumferential portion and include a region that is concave. The inner casing may at least partly define the second circumferential portion and include a region that is concave.

A second aspect of the disclosure provides a gas turbine engine comprising in axial flow series: a fan; a series of outlet guide vanes for guiding flow from the fan; and a bifurcation. The gas turbine engine further comprises an outer casing defining a radially outer extent of a flow path from the fan to the bifurcation. The outer casing includes a profiled region positioned upstream of the bifurcation and the profiled region includes a first circumferential portion adjacent a second circumferential portion, the first circumferential portion having a first curvature and a second circumferential portion having a second curvature, the first curvature being different to the second curvature.

For example, the inner radius of the outer casing of the first portion may be smaller than the inner radius of the outer casing of the second portion. The radius is measured from the major longitudinal axis of the gas turbine engine.

The gas turbine engine of the second aspect of the disclosure may have one or more features of the gas turbine engine of the first aspect of the disclosure.

A third aspect of the disclosure provides a gas turbine engine comprising in axial flow series: a fan; a series of outlet guide vanes for guiding flow from the fan; and a bifurcation. The gas turbine engine further comprises a bypass duct in which the outlet guide vanes and the bifurcation are provided. The bypass duct includes a profiled region positioned upstream of the bifurcation and the profiled region includes a first circumferential portion adjacent a second circumferential portion, the first circumferential portion having a first radial thickness and a second circumferential portion having a second radial thickness, the first radial thickness being smaller than the second radial thickness.

The gas turbine engine of the third aspect of the disclosure may have one or more features of the gas turbine engine of the first aspect of the disclosure.

DESCRIPTION OF DRAWINGS

The invention will now be described, by way of example only, with reference to the accompanying drawings in which:

FIG. 2A illustrates a partial plan view of a fan blade, outlet guide vanes and bifurcation of the engine of FIG. 1;

FIG. 2B illustrates a static pressure field circumferentially around a bypass duct of the engine of FIG. 1 in the region of the bifurcation;

FIG. 2C illustrates a static pressure profile Q-Q extracted from the pressure field illustrated in 2B at a constant radius;

DETAILED DESCRIPTION

Figure 1:
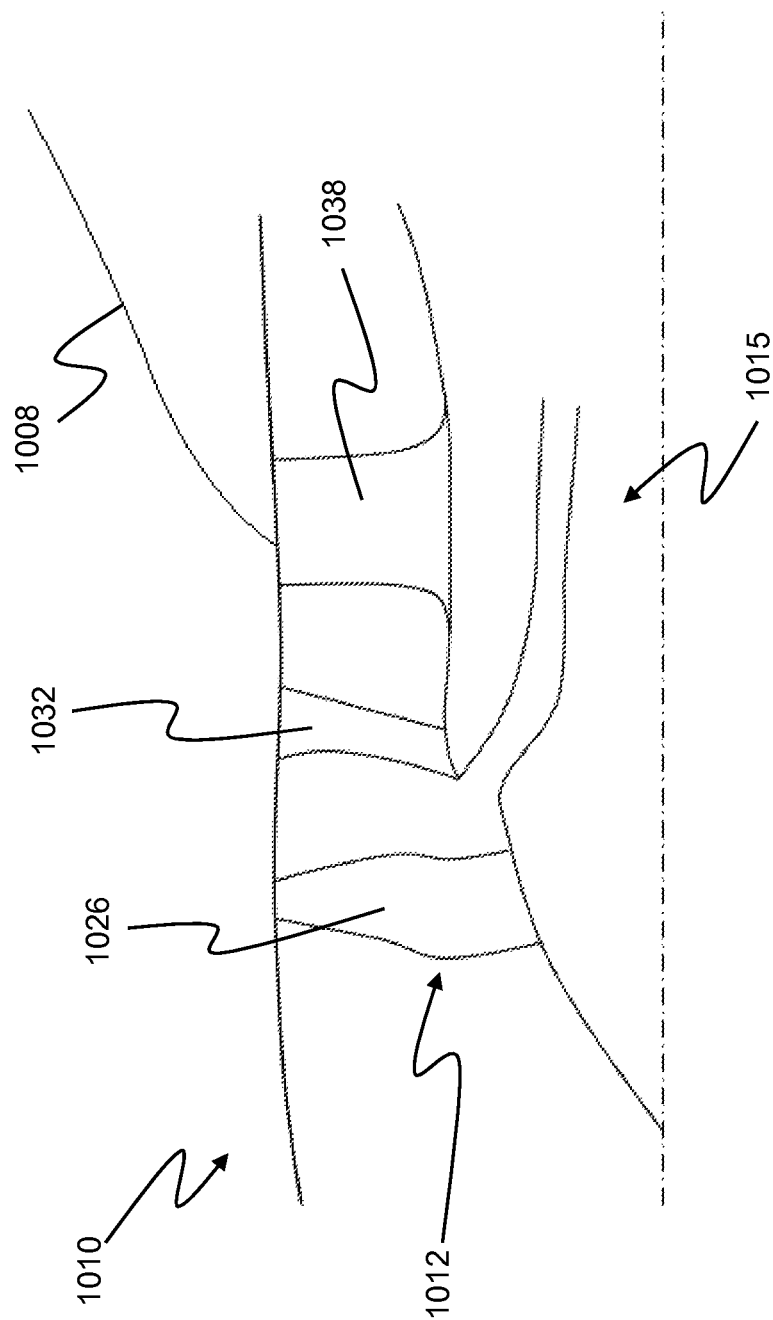
FIG. 1 illustrates a section of a portion of a gas turbine engine of the related art.
Figure 3:
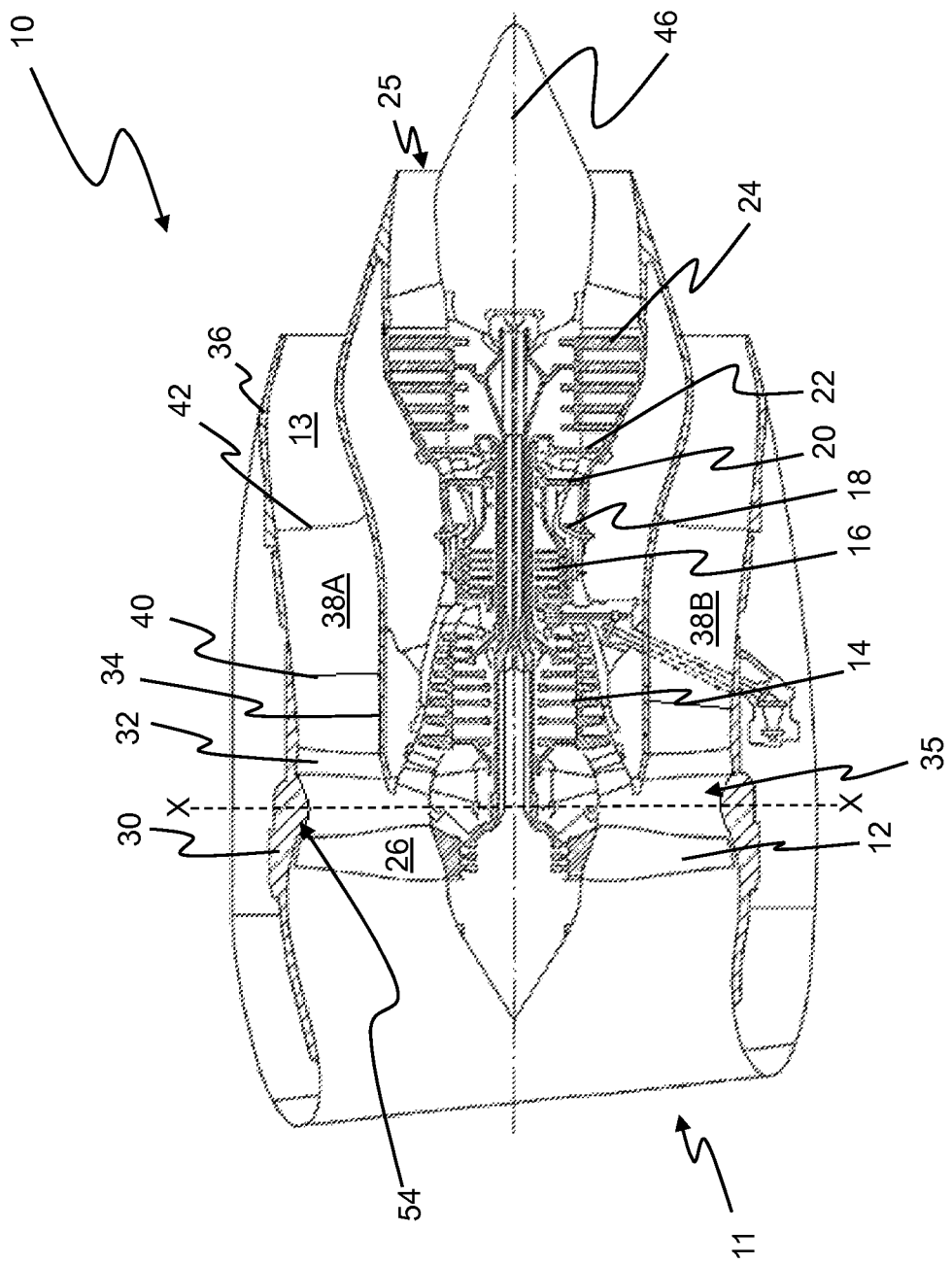
FIG. 3 illustrates a cross section of a gas turbine engine.

With reference to FIG. 3 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts. The working fluid, which has reduced in pressure and temperature, is then expelled through the exhaust nozzle 25 generating the remainder of the engine thrust.

The intake fan 12 includes an array of radially extending fan blades 26 that are mounted to the shaft, the fan blades and shaft forming the fan rotor. The intake fan 12 is circumferentially surrounded by a structural member in the form of a fan casing 30. Outlet guide vanes (OGVs) 32 are positioned downstream of the intake fan 12. In the present embodiment the OGVs support the fan casing, but in alternative embodiments, the OGVs may not provide such a supporting function (e.g. in smaller engines). The OGVs are primarily provided to straighten the flow from the intake fan 12. A series of OGVs are provided in the bypass duct 13 and are spaced circumferentially around the engine core. An inner casing 34 and an outer casing 36 (part of which is defined by the fan casing 30) define the bypass duct 13, and the OGVs extend from the inner casing to the outer casing.

A bifurcation 38A, 38B is positioned downstream of the OGVs. In this embodiment bifurcations are provided at diametrically opposed positions. The bifurcation 38A includes aerodynamically shaped fairings around the pylon structure for the purpose of encasing and directing electrical connections. The function of the bifurcation 38B is to encase the radial drive shaft linking a case mounted accessory gearbox and the intermediate pressure compressor 14.

The bifurcation 38A (which may be referred to as the upper bifurcation) has a leading edge 40 and a trailing edge 42 which is usually located downstream of the end of bypass duct 13, e.g. under the wing. The bifurcation has an aerofoil shape. That is, the bifurcation 38A has two axial sides extending between the leading and the trailing edge, the two axial sides being connected by a curved surface in the region of the leading edge. The bifurcation extends between the inner casing 34 and the outer casing 36, so as to extend between the core and a pylon (not shown) that connects the engine to the wing. In this way electrical components can be efficiently routed to the engine. That is, a radially outer end of the bifurcation is adjacent the outer casing and a radially inner end of the bifurcation is adjacent the radially inner end.

An annular fluid passage way 35 extends from the fan rotor to the bifurcation. The outer casing 36 defines an outer circumferential extent of the passageway and the inner casing 34 defines a rearward portion of the inner circumferential extent of the passageway. A forward portion of the inner circumferential extent of the passageway is defined by a member of the core.

The passageway includes a profiled region 54 positioned upstream of the bifurcation 38A, 38B. In the present embodiment, the outer casing 36 defines the profiled region 54. The profiled region is provided axially between the fan blades 26 and the outlet guide vanes 32. In the present embodiment, the profiled region is spaced axially rearward (i.e. in an axial direction towards the outlet guide vanes) from the fan blades 26. The outer casing 36 is curved in an axial direction so as to provide a graduated transition to the profiled region from the remainder of the outer casing.

Figure 4:
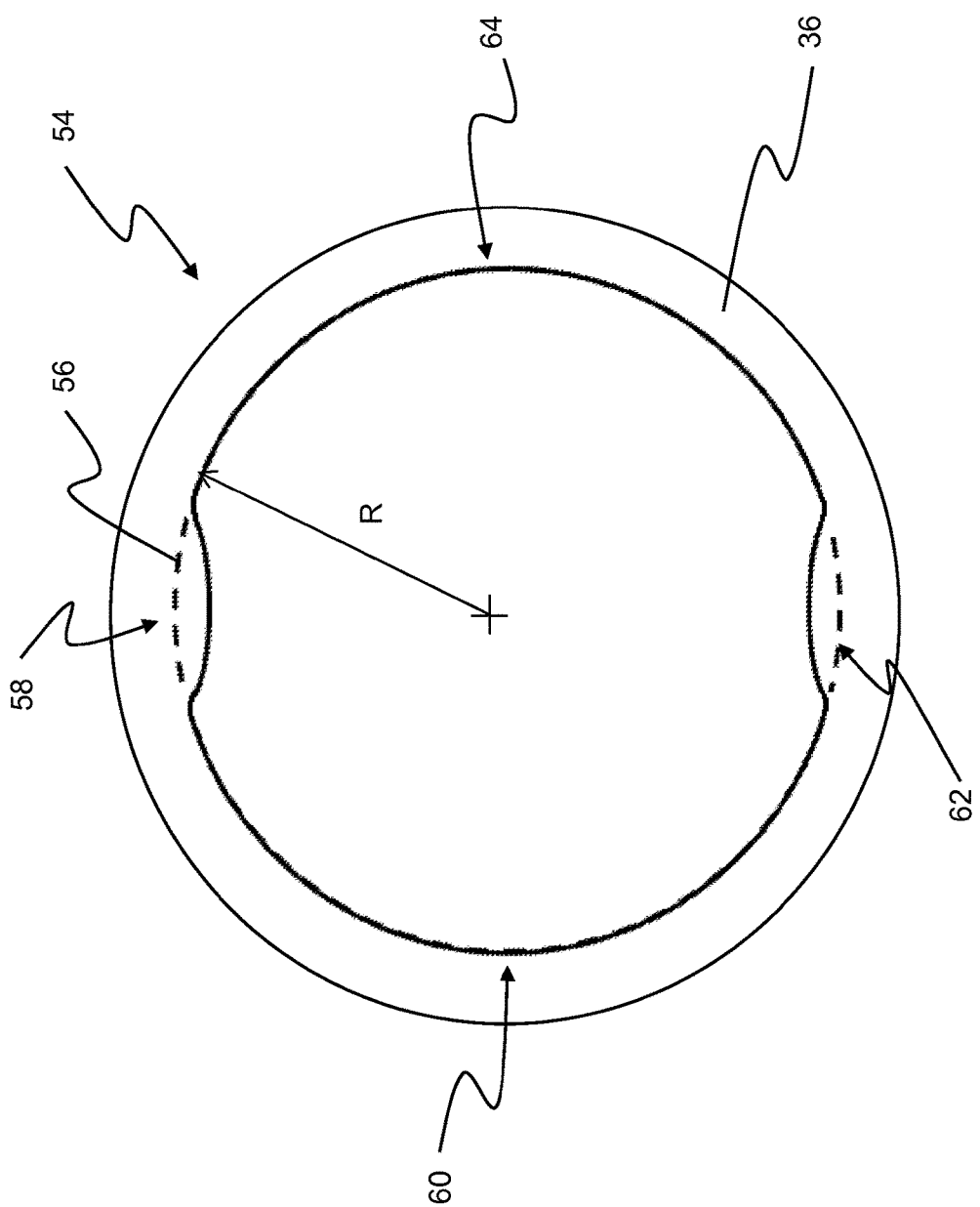
FIG. 4 illustrates a cross section through an outer casing of the gas turbine engine of FIG. 3 at position X-X.

Referring to FIG. 4, it can be seen that the profiled region has a first portion 58 having a first curvature and a second portion 60 having a second curvature. The inner radius of the outer casing in the first portion is smaller than the inner radius of the outer casing in the second portion. This results in the passageway having a smaller radial thickness in the region of the first portion than in the region of the second portion.

The first portion and the second portion are positioned so as to be circumferentially adjacent. The position of the first portion 58 corresponds to the circumferential location of the bifurcation (indicated at 38 in FIG. 3), and the position of the second portion 60 corresponds to a position away from the circumferential location of the bifurcation (indicated at 38 in FIG. 3). In the present embodiment, two bifurcations are provided, accordingly the outer casing further includes a third portion 62 having a curvature similar to the first portion and a fourth portion 64 having a curvature similar to the second portion. The position of the third portion corresponds to a circumferential position of the other bifurcation and the position of the fourth portion corresponds to a position away from (e.g. between) the two bifurcations.

In FIG. 4, the nominal curvature of the casing is indicated by a dotted line 56. The nominal curvature corresponds to the general curvature that would be present if the profiled region were not shaped to have varying curvature. It can be seen that the second portion 60 and the fourth portion 64 follow the general nominal curvature of the casing. The first portion 58 and the third portion 62 are concave, so as to reduce the inner radius of the casing in the position of the first portion and the third portion. The minimum radius required, e.g. the degree of convex curvature required, can be calculated using standard modelling techniques known in the art, and will vary depending on the engine architecture.

The provision of the profiled region 54 can reduce the static pressure field directly upstream of the bifurcation. This has the effect of reducing the forcing on the fan blades, and therefore reducing fan blade vibration.

FIG. 4 illustrates one suitable profiled region, but various other profiled regions may be used. The optimum shape of the profiled region can be selected using standard modelling techniques, and is selected so as to minimise the static pressure region formed, in use, directly upstream of the bifurcation.

FIGS. 5 to 8 illustrate alternative profiled regions. Similar reference numerals are used to illustrate similar features, but with a prefix of "1", "2", "3", or "4" differentiating between the different embodiments. Mainly the differences between the embodiments will be described here.

Figure 5:
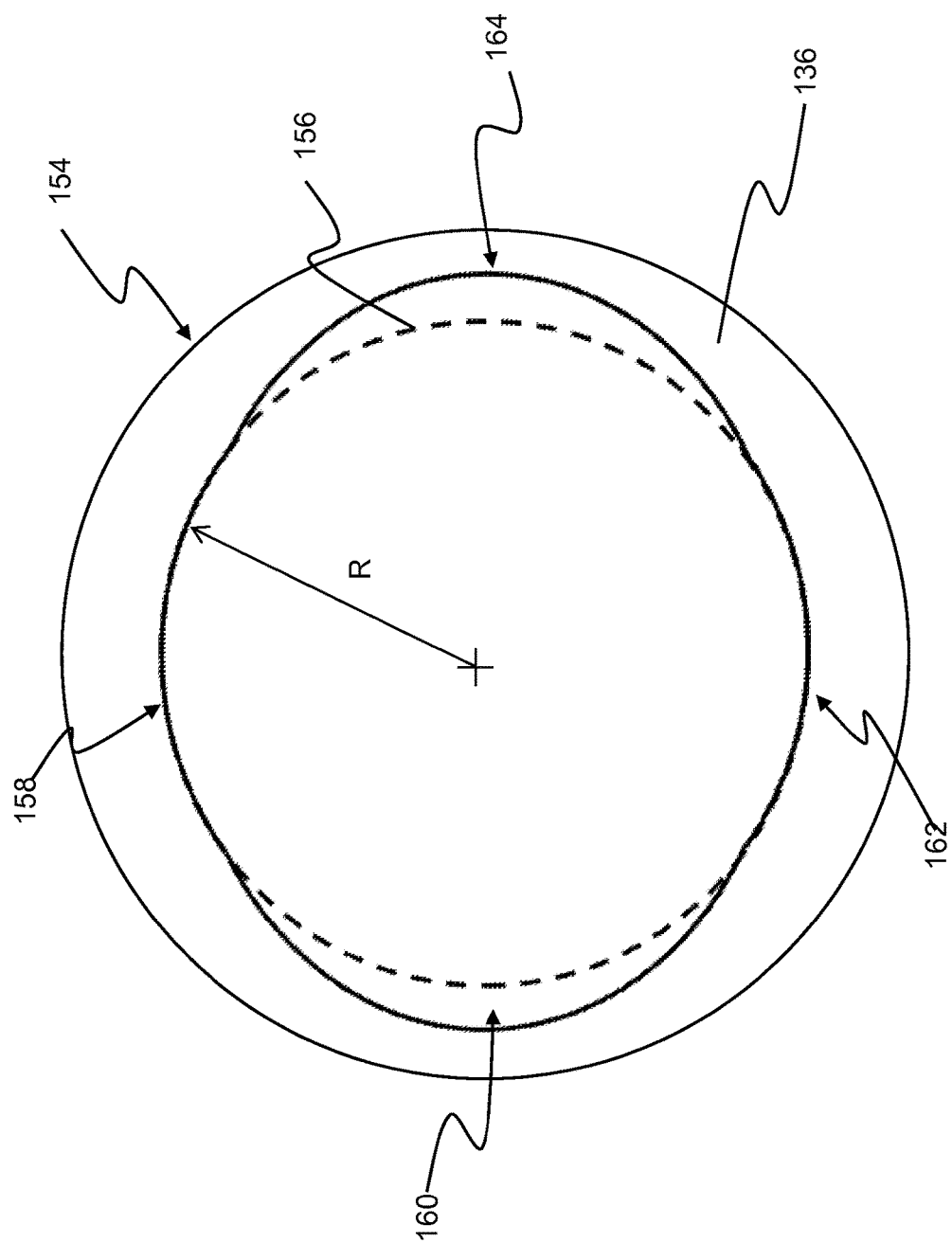
FIGS. 5 and 6 illustrate an alternative cross section of an outer casing of an alternative gas turbine engine.

Referring to FIG. 5, the first circumferential portion 158 and the third circumferential portion 162 are provided at a position corresponding to the circumferential location of the bifurcation, and the second circumferential portion 160 and the fourth circumferential portion 164 are provided at a position corresponding to a location away from the bifurcation, similar to the embodiment of FIG. 4. However, in the embodiment of FIG. 5 the first and the third circumferential portions follow the nominal curvature of the outer casing (indicated by dotted line 156). The second and fourth circumferential portions are concave and deviate radially outwardly from the nominal curvature of the outer casing, so as to increase the inner radius of the outer casing in a region corresponding to a position circumferentially away from the location of the bifurcation.

Figure 6:
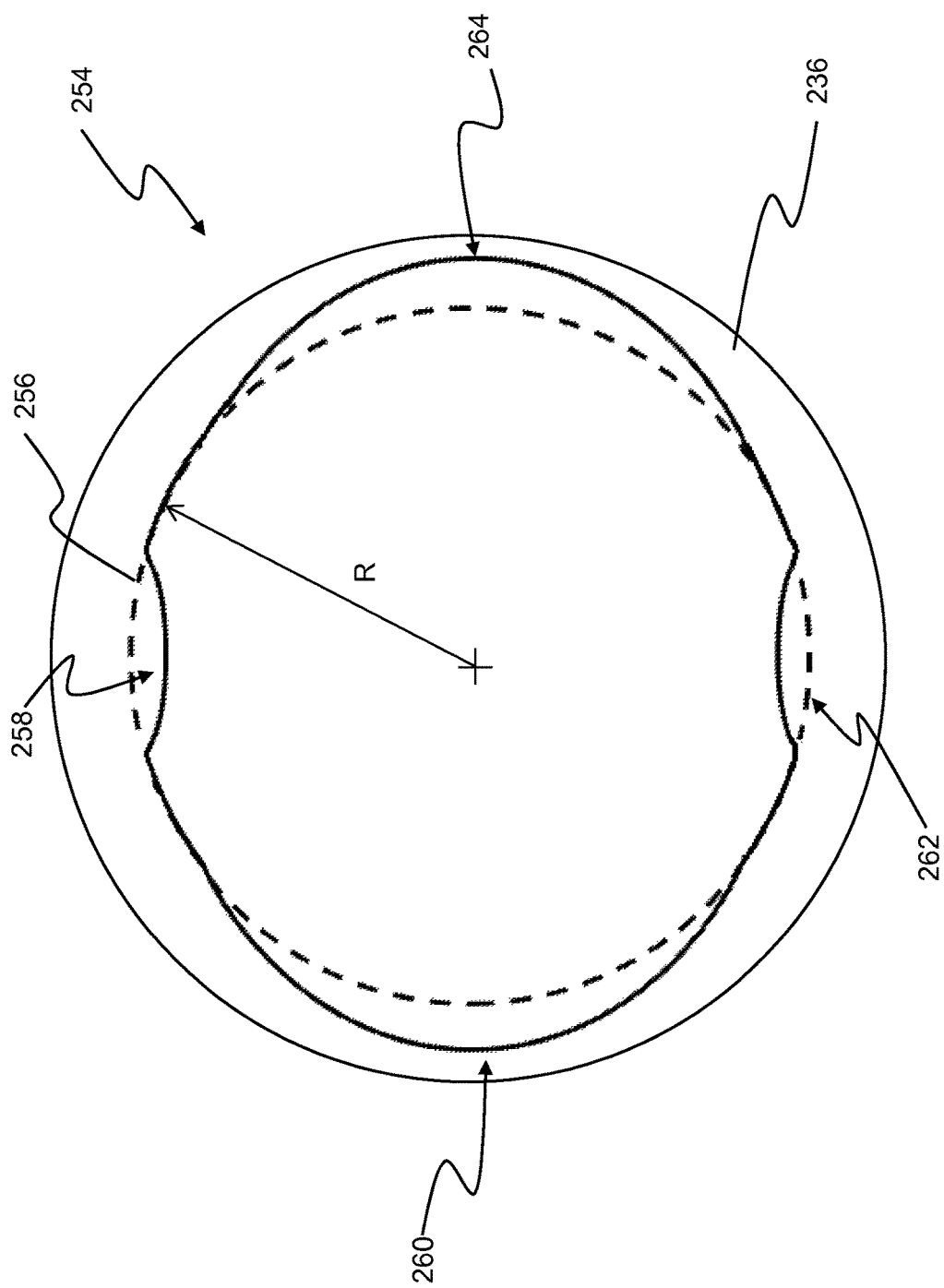

Referring to FIG. 6, in a further alternative embodiment, the first portion 258 and the third portion 262 are convex and the second portion and the fourth portion are both concave.

Figure 7:
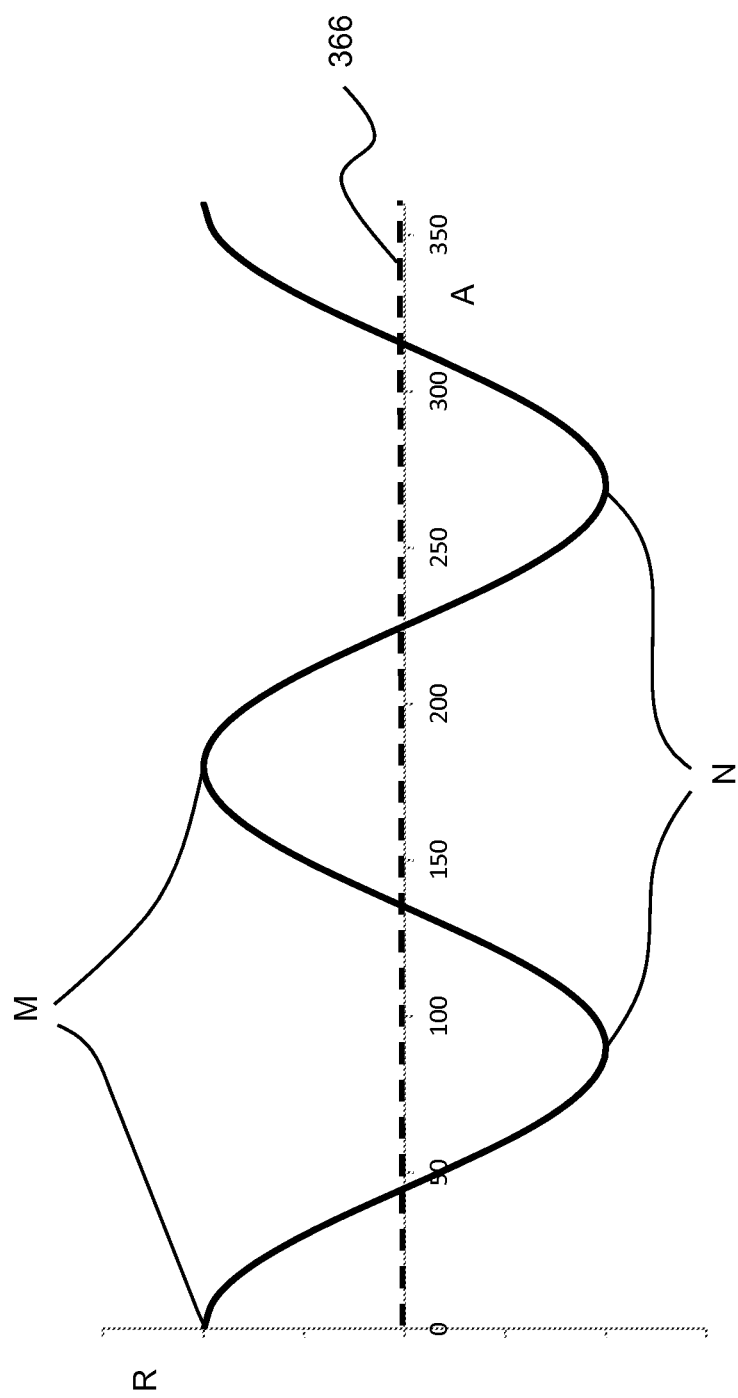
FIGS. 7 and 8 illustrate the deviation in curvature from a nominal curvature of a further alternative outer casing of a further alternative gas turbine engine.

An example of how the radius R can deviate from the nominal radius at various points A along the circumference (indicated by degrees) is shown in FIG. 7. The nominal radius is indicated by the dotted line 366. In FIG. 7, the position of 0° is substantially aligned with the centreline of the upper bifurcation. As can be seen from a comparison between FIG. 7 and FIG. 2C, the inner casing can be profiled to include a convex portion M in regions corresponding to the position of the bifurcations, e.g. the position of maximum static pressure. The convex profile accelerates the flow through the OGVs which reduces the static pressure. The inner casing can further be profiled to include a concave portion N in regions corresponding to the positions away from the bifurcations, e.g. in the positions of minimum static pressure. The concave profile decelerates flow through the OGVs which increases static pressure. The provision of the convex and concave portions reduces the circumferential static pressure variation in a position axially between the OGV trailing edge and the bifurcation leading edge. In the embodiment illustrated in FIG. 7, the convex and concave curvatures are counter-phased (90° out of phase from the pressure field).

Figure 8:
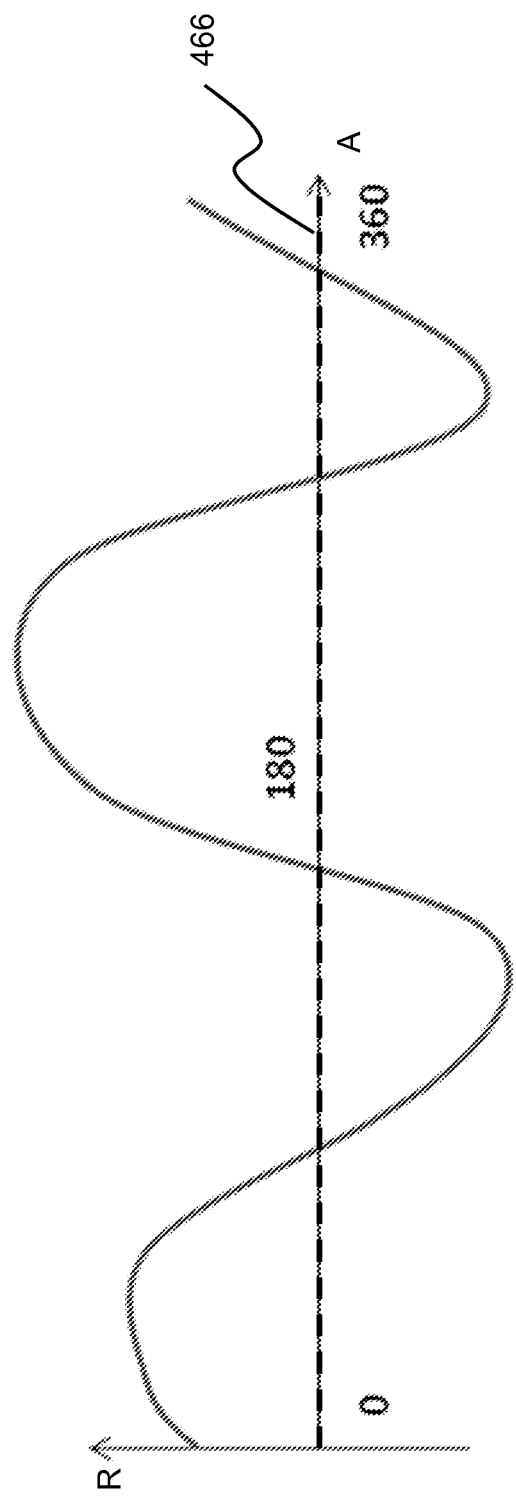

In the described examples, the curvature of the first portion has been similar to the curvature of the third portion and the curvature of the second portion has been similar to the curvature of the fourth portion. However, in alternative embodiments each portion may have a different curvature, as illustrated in FIG. 8. Furthermore, the curvature may vary within each portion. It may be desired to have a different curvature, if for example, the shape of the first bifurcation is different to the second bifurcation.

Provision of the described profiled region 54, 154, 254 can reduce forcing on the fan rotor and improve aerodynamic performance.

Further alternative embodiments are illustrated in FIGS. 9 to 12B. Similar reference numerals are used for similar features as those previously described, but with a prefix "5" or "6". Mainly the differences between the present embodiment and the previous embodiments will be described.

Figure 9:
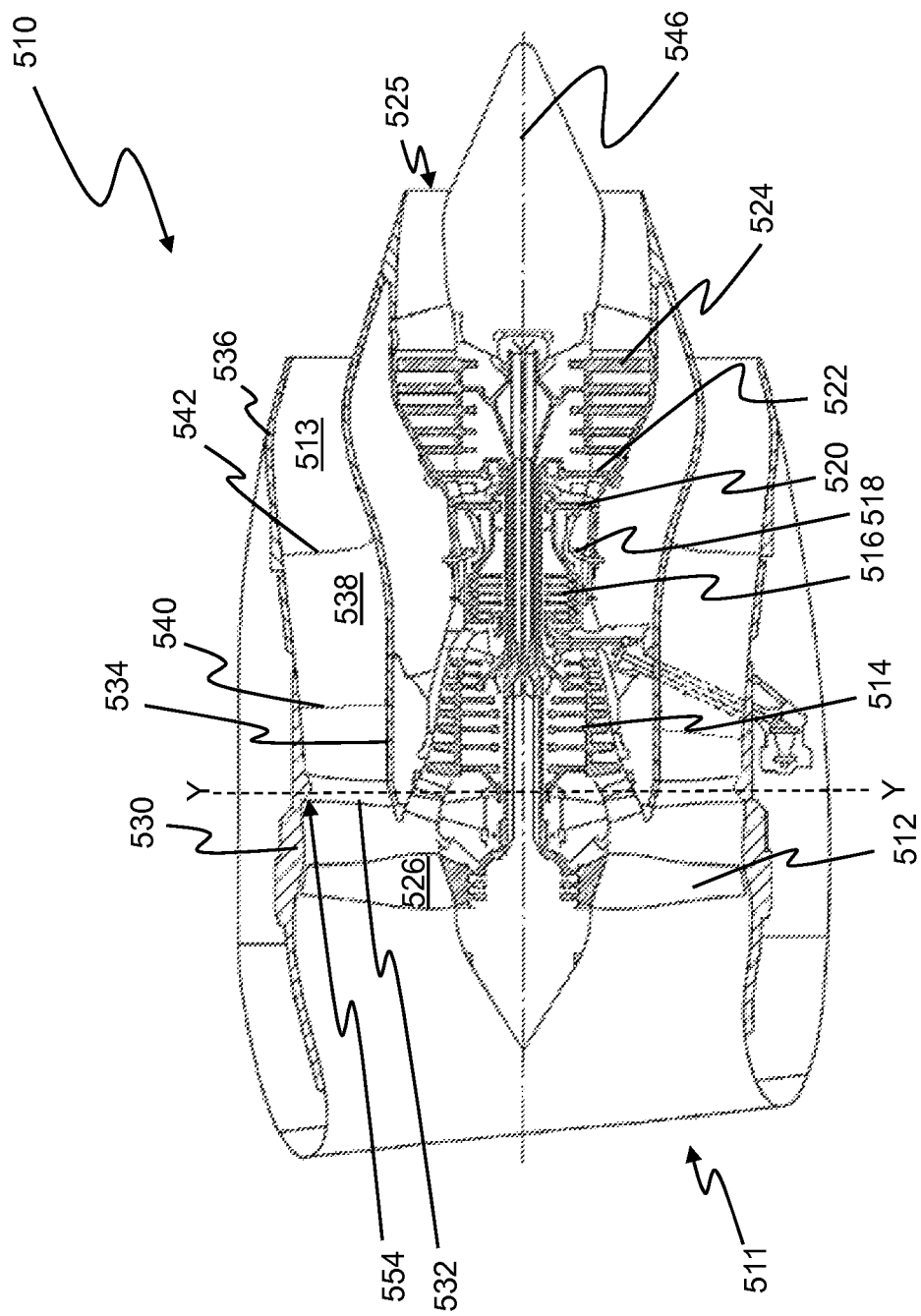
FIG. 9 illustrates a cross section of a yet further alternative gas turbine engine.

Referring firstly to FIG. 9, the outer casing includes a profiled region 554 positioned upstream of the bifurcation. However, the embodiment of FIG. 9 differs from the previously described embodiments in that the profiled region is positioned in a region corresponding to the position of the outlet guide vanes 532. In this way the profiled region alters the radial depth of passages formed between the outlet guide vanes.

Figure 10:
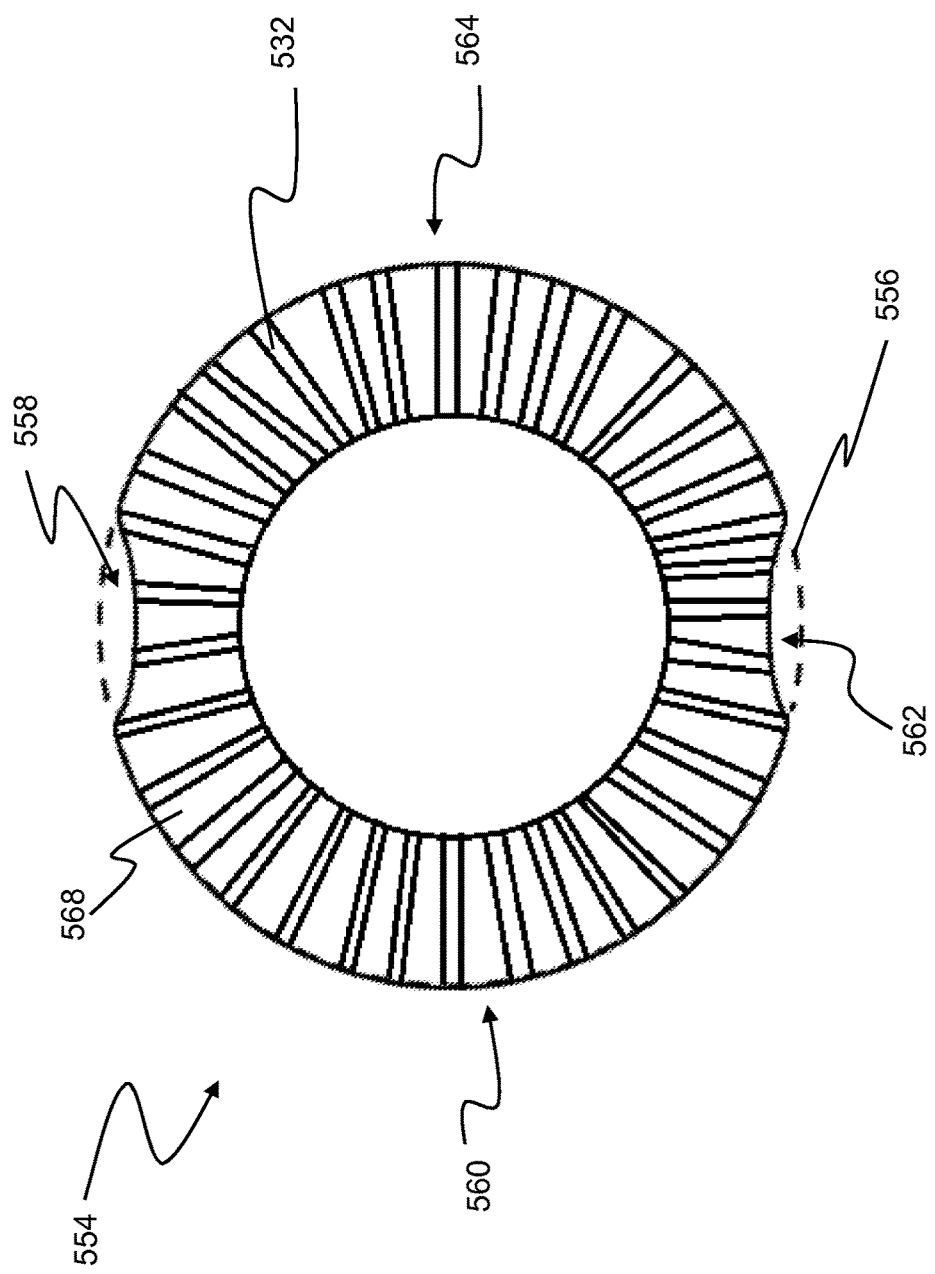
FIG. 10 illustrates a cross section through a bypass duct of the gas turbine engine of FIG. 9 at position Y-Y.

Referring to FIG. 10, similar to the previously described embodiments, the profiled region 554 includes a first portion 558 and a third portion 562 positioned in a region corresponding to the circumferential position of the bifurcation. The profiled region further includes a second portion 560 and a fourth portion 564 positioned in a region corresponding to a circumferential position away from the bifurcation. The shape of the profiled region may be varied in the similar way to that described for the previous embodiments. However, in the presently described embodiment the second and fourth portions follow the nominal circumference of the casing (indicated by dashed line 556), and the first and third portions are convex.

The first and third portions 558, 562 provide a continuous deviation from the nominal curvature 556 and extend across a plurality of outlet guide vanes 532 and at least two passages 568 formed by the outlet guide vanes. The first and third portions reduce the radial depth of the corresponding passages 568 from an axial position adjacent a leading edge of an outlet guide vane to an axial position adjacent a trailing edge of an outlet guide vane. The circumferential extent of the first and third portions is at least equal to the circumferential extent of the bifurcation but can exceed it by a few OGV passages.

Figure 11:
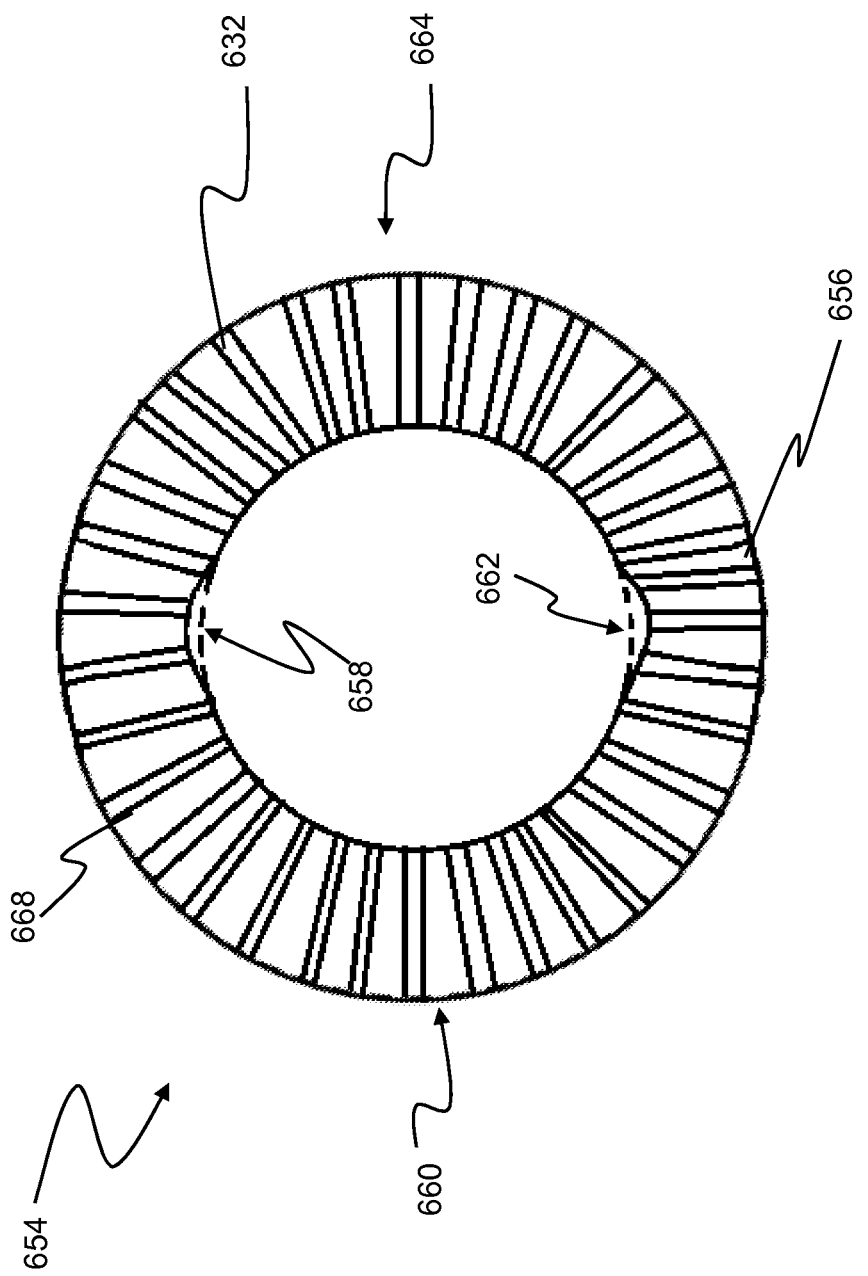
FIGS. 11 and 12 a cross section through an alternative bypass duct of an alternative gas turbine engine.
Figure 12:
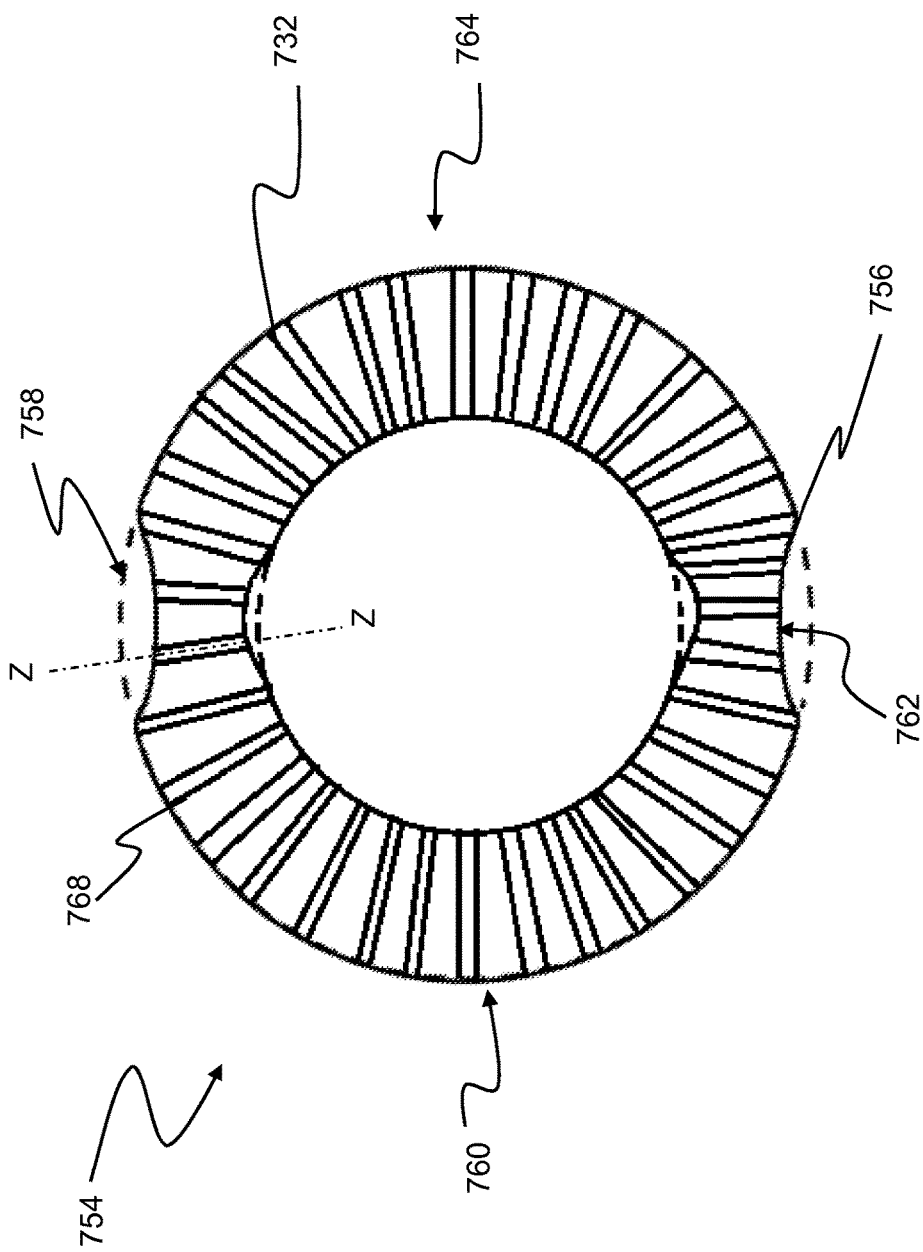

In the described embodiments the outer casing has been shaped to form the profiled region of the passageway, but in alternative embodiments additionally or alternatively the inner casing may be shaped to define the profiled region. FIG. 11 illustrates an embodiment where only the inner casing is shaped to define the profiled region and FIG. 12 illustrates an embodiment where both the inner and the outer casing are shaped to define the profiled region.

Figure 13B:
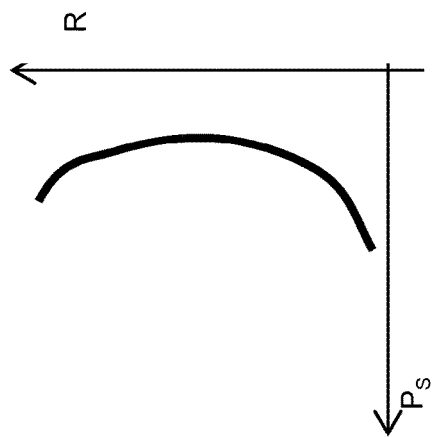
FIG. 13B illustrates static pressure distribution immediately upstream of a bifurcation of the gas turbine engine having the outlet guide vanes of FIG. 13A.
Figure 14B:
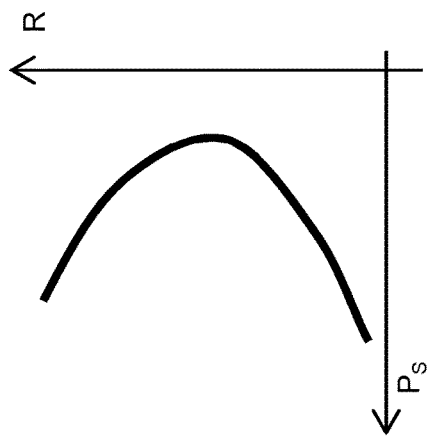
FIG. 14B illustrates a static pressure distribution immediately upstream of a bifurcation of a gas turbine engine of the prior art.
Figure 13A:
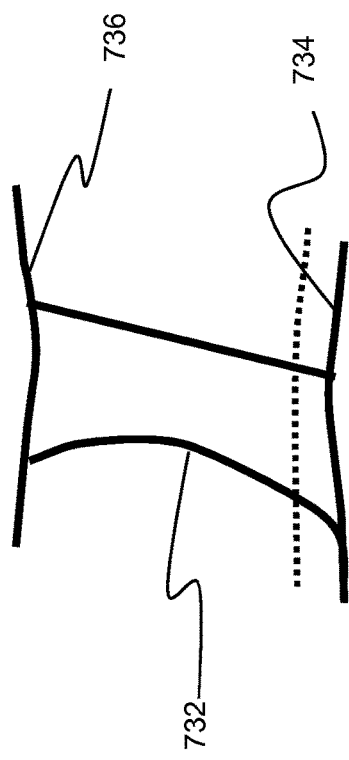
FIG. 13A shows a cross section through an outlet guide vane of the gas turbine engine of FIG. 12 at position Z-Z.
Figure 14A:
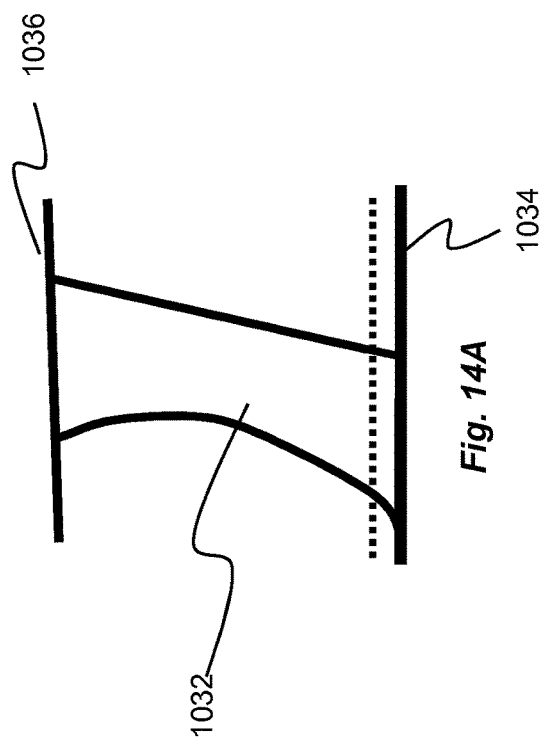
FIG. 14A shows a cross section though an outlet guide vane of a gas turbine engine of the prior art.

Referring now to FIGS. 13A and 13B, the variation in static pressure immediately upstream of the bifurcation of a further embodiment is shown. This can be compared to the variation in static pressure shown in FIGS. 14A and 14B for a gas turbine engine of the prior art. As can be seen from a comparison of FIGS. 13A and 13B with FIGS. 14A and 14B, the provision of the profiled region significantly improves the uniformity of the static pressure formed, in use, immediately upstream of the bifurcation. This reduces the forcing on the fan blades and therefore reduces vibration of the fan blades.

A further advantage of profiling the casing across a number of OGVs in a region corresponding to the position of the OGVs is that the aerodynamic performance of the engine is improved. The stagger and camber of the OGVs can be selected so as to make the bifurcation as opaque as possible when seen from the fan blades, and due to the profiling of the casing the streamtube will contract. An outer stream line of the streamtube is indicated by a dotted line in FIG. 13A and in FIG. 14A, it can be seen that the streamtube in FIG. 13A contracts towards the trailing edge of the OGV, whereas the streamtube in FIG. 14A does not contract. The streamtube contraction means that the ratio of the area of the streamtube (or the passage between the OGVs) at the passage inlet compared to at the passage outlet is nearer one than that of the prior art, thus the diffusion and aerodynamic losses are reduced.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The described embodiments all related to gas turbine engines having two bifurcations, but in some embodiments the gas turbine engine may only have one bifurcation. When only one bifurcation is provided it will be appreciated that only a first circumferential portion and a second circumferential portion may be provided.

The invention claimed is:

1. A gas turbine engine comprising in axial flow series:
   a fan having a fan rotor;
   a series of outlet guide vanes for guiding flow from the fan, the outlet guide vanes having a leading edge and a trailing edge;
   a bifurcation; and
   a substantially annular fluid passageway extending from the fan rotor to the bifurcation, the outlet guide vanes being positioned within the passageway, wherein
   the passageway includes a profiled region positioned upstream of a leading edge of the bifurcation, the profiled region including a first circumferential portion positioned adjacent a second circumferential portion, the first circumferential portion having an axial position corresponding to an axial position of the second circumferential portion,
   the first circumferential portion having a first average radial thickness and a second circumferential portion having a second average radial thickness, the first average radial thickness being smaller than the second average radial thickness,
   the first circumferential portion is positioned in a region corresponding to a circumferential position of the bifurcation,
   a circumferential extent of the first circumferential portion is substantially equal to a circumferential extent of the bifurcation,
   the profiled portion of the passageway has an outer circumference and an inner circumference,
   the inner circumference and/or the outer circumference includes a first portion having a first average curvature and a second portion having a second average curvature, the first average curvature being different to the second average curvature, and
   the inner circumference and/or the outer circumference includes a region that is convex when compared to a nominal circumference of the casing.

2. The gas turbine engine according to claim 1, wherein the second circumferential portion is positioned in a region corresponding to a circumferential position away from the bifurcation.

3. The gas turbine engine according to claim 1, wherein the profiled region is upstream of the outlet guide vanes.

4. The gas turbine engine according to claim 3, wherein the profiled region is provided between the fan and the outlet guide vanes, and the profiled region is spaced rearward of the fan rotor.

5. The gas turbine engine according to claim 1, wherein a further profiled region is provided at an axial position corresponding to the axial position of the outlet guide vanes between the leading edge and trailing edge of said outlet guide vanes.

6. The gas turbine engine according to claim 1, wherein the inner circumference and/or the outer circumference include a region that is concave when compared to the nominal circumference of the casing.

7. The gas turbine engine according to claim 1, wherein the curvature of the first portion varies at different circumferential positions of the first portion.

8. The gas turbine engine according to claim 1, wherein the curvature of the second portion varies at different circumferential positions of the second portion.

9. The gas turbine engine according to claim 1, wherein the curvature of the second portion is constant along the circumferential extent of the second portion.

10. The gas turbine engine according to claim 1, comprising an outer casing defining a radially outer extent of the annular fluid passageway, and wherein the outer casing is shaped to at least partially define the profiled region.

11. The gas turbine engine according to claim 1, comprising an inner casing defining a portion of the radially inner extent of the fluid passageway, and wherein the inner casing is shaped to at least partially define the profiled region.

12. The gas turbine engine according to claim 1, wherein the passageway includes a curved graduated transition in an axial direction between the profiled region and the remainder of the passageway.

13. A gas turbine engine comprising in axial flow series:
a fan;
a series of outlet guide vanes for guiding flow from the fan;
a bifurcation; and
an outer casing defining a radially outer extent of a flow path from the fan to the bifurcation, wherein
the outer casing includes a profiled region positioned upstream of the bifurcation and the profiled region includes a first circumferential portion adjacent a second circumferential portion, the first circumferential portion having an axial position corresponding to an axial position of the second circumferential portion,
the first circumferential portion having a first curvature that is constant along a circumferential extent of the first circumferential portion and a second circumferential portion having a second curvature that deviates radially outward from the first curvature for a circumferential extent of the second circumferential portion, and
a circumferential extent of the first circumferential portion is substantially equal to a circumferential extent of the bifurcation.

14. The gas turbine engine according to claim 13, wherein the profiled region of the outer casing is positioned axially between the fan and the outlet guide vanes.

15. A gas turbine engine comprising in axial flow series:
a fan;
a series of outlet guide vanes for guiding flow from the fan;
a bifurcation; and
a bypass duct in which the outlet guide vanes and the bifurcation are provided, the bypass duct including an outer casing and an inner casing, wherein
the bypass duct includes a profiled region positioned upstream of the bifurcation and the profiled region includes a first circumferential portion adjacent a second circumferential portion, the first circumferential portion having an axial position corresponding to an axial position of the second circumferential portion,
the first circumferential portion having a first radial thickness and a second circumferential portion having a second radial thickness,
the first circumferential portion including at least one of the outer casing and the inner casing protruding into the bypass duct for a circumferential extent of the first circumferential portion such that the first radial thickness is smaller than the second radial thickness, and
a circumferential extent of the first circumferential portion is substantially equal to a circumferential extent of the bifurcation.

16. The gas turbine engine according to claim 15, wherein the profiled region of the bypass duct is axially positioned between the fan and the outlet guide vanes.

17. A gas turbine engine comprising in axial flow series:
a fan having a fan rotor;
a series of outlet guide vanes for guiding flow from the fan, the outlet guide vanes each having a leading edge;
a bifurcation; and
a substantially annular fluid passageway extending from the fan rotor to the bifurcation, the outlet guide vanes being positioned within the passageway, wherein
the passageway includes a profiled region positioned upstream of a leading edge of the bifurcation, the profiled region including a first circumferential portion positioned adjacent a second circumferential portion, the first circumferential portion having an axial position corresponding to an axial position of the second circumferential portion,
the first circumferential portion having a first average radial thickness and a second circumferential portion having a second average radial thickness, the first average radial thickness being smaller than the second average radial thickness,
the first circumferential portion is positioned in a region corresponding to a circumferential position of the bifurcation, and
the profiled region is upstream of the outlet guide vanes such that a downstream end of the profiled region is upstream of the leading edge of each of the outlet guide vanes.

* * * * *